United States Patent [19]

Sonoda et al.

[11] Patent Number: 4,644,791
[45] Date of Patent: Feb. 24, 1987

[54] MOVING APPARATUS FOR A HOLLOW CURVED PIPE-ARRANGEMENT AND AN OPERATING METHOD IN THE PIPE-ARRANGEMENT BY USING THE MOVING APPARATUS

[75] Inventors: Shinji Sonoda, Hitachi; Norihiko Ozaki, Mito; Seishi Watahiki, Katsuta; Yasuzi Sakuma; Masayoshi Yamaguchi, both of Hitachi, all of Japan

[73] Assignee: Hitachi, Ltd., Tokyo, Japan

[21] Appl. No.: 641,677

[22] Filed: Aug. 17, 1984

[30] Foreign Application Priority Data

Aug. 20, 1983 [JP] Japan .................. 58-152354

[51] Int. Cl.$^4$ ............... G01M 19/00; G01D 21/00
[52] U.S. Cl. ................... 73/432.1; 242/54 A; 254/134.3 FT
[58] Field of Search ............ 73/432 R, 432 G, 432 B; 254/134.3 FT, 417; 15/104.35 N, 104.06 B; 242/54 A

[56] References Cited

U.S. PATENT DOCUMENTS

| | | | |
|---|---|---|---|
| 1,096,618 | 5/1914 | Fussell | 254/134.3 FT |
| 1,939,796 | 12/1933 | Spowort | 15/104.35 N |
| 2,336,334 | 12/1943 | Zublin | 15/104.35 N |
| 2,383,843 | 8/1945 | Blanc | 15/104.35 N |
| 3,195,823 | 7/1965 | Simmons | 242/54 A |
| 3,534,423 | 10/1970 | Ratliff | 15/104.35 N |
| 3,585,076 | 6/1971 | Pronge | 15/104.35 N X |
| 3,612,487 | 10/1971 | Raney | 73/432 B X |
| 3,928,885 | 12/1975 | Peterson et al. | 15/104.35 N |
| 3,983,593 | 10/1976 | Naeve | 254/134.3 FT X |
| 3,994,173 | 11/1976 | Ward et al. | 73/432 B |
| 4,413,808 | 11/1983 | Finkle | 254/134.3 FT |

FOREIGN PATENT DOCUMENTS

| | | | |
|---|---|---|---|
| 2513080 | 7/1976 | Fed. Rep. of Germany | 242/54 R |
| 2908351 | 9/1980 | Fed. Rep. of Germany | 73/432 B |
| 24278 | 2/1980 | Japan | 73/432 B |

Primary Examiner—Michael J. Tokar
Assistant Examiner—Tom Noland
Attorney, Agent, or Firm—Antonelli, Terry & Wands

[57] ABSTRACT

A moving apparatus for moving a moving member within a hollow curved pipe arrangement and method of performing operations within the pipe arrangement by using the apparatus, with the apparatus including a long moving member made of a material having an elasticity and a moderate degree of flexibility, a supporting device for continuously winding the moving member therearound and for supporting the same, and a prime mover connected to the supporting device, through a rotating shaft, so as to supply an electric power to the supporting device at the time of winding the moving member, whereby an elastic strain energy is stored in the moving member by rotating the supporting device by the prime mover and winding the moving member around the same, and, while the elastic strain energy thus stored is continuously released, the moving member is allowed continuously to move within the pipe arrangement. The operations performed include drawing a wire into the pipe arrangement, and inspecting the interior of the pipe arrangement by providing an inspection device on a tip end of the moving member of the moving apparatus and performing continuous inspecting operations within the pipe arrangement while the moving member is moved within the pipe arrangement.

4 Claims, 5 Drawing Figures

MOVING APPARATUS FOR A HOLLOW CURVED PIPE-ARRANGEMENT AND AN OPERATING METHOD IN THE PIPE-ARRANGEMENT BY USING THE MOVING APPARATUS

BACKGROUND OF THE INVENTION

The present invention relates to a moving apparatus for moving a moving member within a hollow curved pipe-arrangement and a method of performing operations within the pipe arrangement by using the moving apparatus. More particularly, the invention is concerned with a moving apparatus for moving a moving member, for drawing a cable or wire such as an electric wire, as well as the operation of inserting various inspection devices for maintenance and inspection into, a pipe-arrangement prepared by combining elbows, bent pipes, branch pipes, laid, for example, underground in a state wherein it is curved in a complicated manner, and also a method of performing the operations within the pipe-arrangement by using the moving apparatus.

Conventionally, in order to carry out the inspecting operation within a hollow curved pipe-arrangement, it is necessary to insert the inspecting devices such as, for example, checking and working instruments into the pipe-arrangement. For this reason, the conventional inspecting operation is carried out by passing a tractive inserting wire through the pipe arrangement and causing this wire to pull and insert such inspecting devices, or, alternatively, by loading the inspecting devices directly onto a moving device in the pipe arrangement and causing this moving device to pull the inspecting devices. On the other hand, the wiring operation for a cable such as, for example, an electric wire was carried out by passing it through the pipe arrangement in the same manner as in the case of passing said tractive inserting wire therethrough.

A moving device arranged to move through the pipe arrangement by utilizing the fluid therein is conventionally employed as a moving device which moves in the hollow curved pipe-arrangement. This moving device includes moving legs, a main body arranged to control the legs and adjust the fluid pressure, an operation instrument pulled by the main body, and a working instrument. A control device controls the position and velocity of the moving device and the working instrument, a monitoring device monitors the operating manner of the devices and instruments and gives commands thereto, and an electric power source is provided. An operation wire or cable wound around a drum is attached directly to the moving device and and the wire or cable is pulled by the moving device in the pipe arrangement, whereby the wiring operation in the pipe arrangement, or the inspecting operation in the pipe arrangement is carried out. However, a disadvantage of the above-described type of moving device resides in the fact that it is only capable of passing through a pipe-arrangement having an inner diameter of, for example, about 150 mm or more and a radius of curvature of about 750 mm. Thus, the above-proposed moving device may not be applied in various practical pipes such as a small-diameter pipe, a bend, an elbow, or a branch pipe having an inner diameter of about 20 to 40 mm. More particularly, the proposed type of moving device is not useable in, for example, a curved pipe arrangement comprising a combination of such practical pipes.

Namely, the above-mentioned moving device is intended to be applied with respect to a pipe or pipe-arrangement having a relatively large inner diameter. Additionally, although it can be effectively used with respect to a linear pipe, difficulty is encountered in applying the same to a hollow curved pipe-arrangement prepared by combining various pipes in a complicated manner.

SUMMARY OF THE INVENTION

The aim underlying the present invention resides in providing a moving apparatus having a moving member capable of being moved within a pipe arrangement even when the pipe arrangement is a hollow curved pipe arrangement prepared by combining small-diameter pipes, bends, elbows, branch pipes, etc., and a method of performing operations within the hollow curved pipe arrangement by using the moving apparatus, with the operations including the operation of distributing or wiring a wire into, as well as the operation of inspecting the interior of, the hollow curved pipe arrangement.

In accordance with advantageous features of the present invention, a moving apparatus for moving a moving member within a hollow curved pipe arrangement is provided which includes a long moving member made of a material having an elasticity and a moderate degree of flexibility, a supporting device for continuously winding the moving member therearound and supporting the same, and a prime mover connected to the supporting device through a rotating shaft thereof so as to supply an electric power to the supporting device at the time of winding the moving member, whereby an elastic strain energy is stored in the moving member by rotating the supporting device by the prime mover, and winding the moving member around the same, and, while the elastic strain energy thus stored is continuously released, the moving member is allowed continuously to move within the pipe arrangement. Additionally, the present invention provides a method of performing operations within the pipe arrangement by using the moving apparatus, which operations include the operation of drawing a wire into the pipe arrangement by moving together with the moving member the wire to be drawn into the pipe arrangement at the time when the moving member is moved, or by moving beforehand the moving member of the moving apparatus up to an outlet of the pipe arrangement and connecting the wire to be drawn to a portion of the moving member and, thereafter, bringing the moving member back through the pipe arrangement, and the operation of inspecting the interior of the pipe arrangement by providing an inspection device on a tip end of the moving member of the moving apparatus and performing continuous inspecting operations within the pipe arrangement by means of such inspection device while the moving member is being moved within the pipe arrangement.

DETAILED DESCRIPTION

Figure 1:
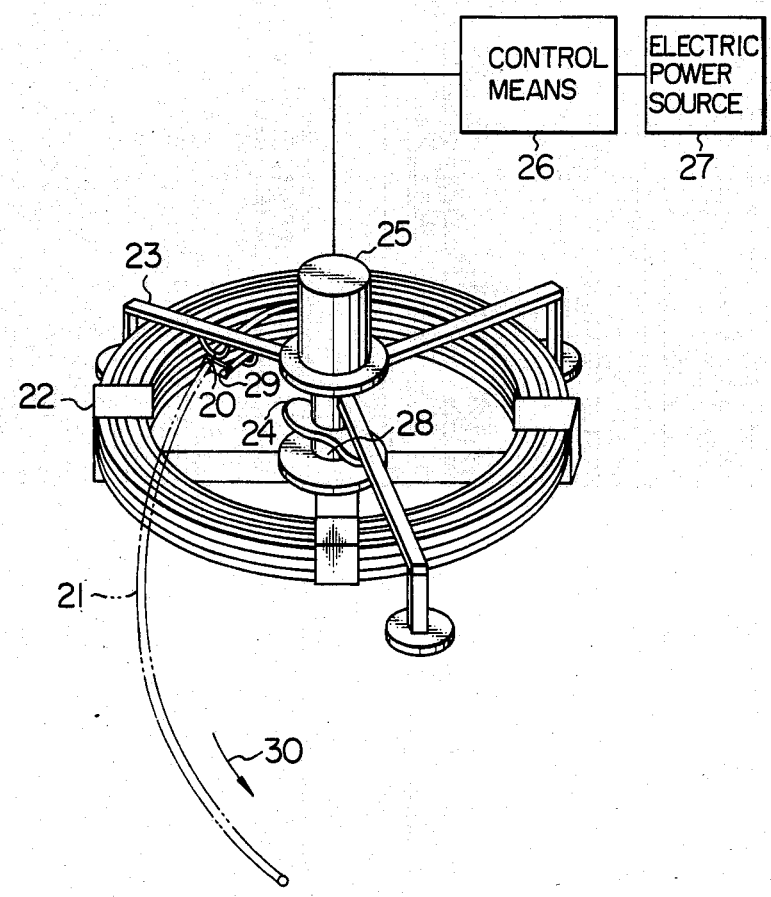
FIG. 1 is a perspective view of a moving apparatus according to an embodiment of the present invention.

Referring now to the drawings, the present invention will be explained.

As shown in FIG. 1, a moving apparatus for moving a moving member within a pipe arrangement according to the present invention comprises a long moving member 21 having an elasticity and a moderate degree of flexibility, a prime mover 25 made integral with a rotating shaft 28 and mounted on a supporting frame 23, a holder 22 arranged to take up the moving member 21 and deliver the same while allowed to rotate integrally with the rotating shaft 28 through the operation of the prime mover 25, a flywheel 24 for stabilizing the operation of taking up and delivering the moving member 21, a detector mounted on the prime mover 25 and arranged to detect the velocity with which to take up and deliver the moving member 21 and the position at which the moving member is located, a control means 26 for controlling said velocity and said position in accordance with the results of detection made by the detector, and an electric power source 27. The moving apparatus further comprises a stopper 29 provided on one piece of said supporting frame 23, which stopper 29 is intended to support a forward end of the moving member 21 taken up by the holder 22.

The manner of operation of the moving apparatus according to this embodiment will now be described. At the state wherein the moving member 21 is freely released, the prime mover 25 is operated and rotates the holder 22, thereby taking up the moving member 21 sequentially into the holder 22. Thereafter, the forward end of the moving member 21 is fixed by the stopper 29, thereby preventing the moving member from being supplied in the direction of the arrow 30. Thus, an elastic strain energy is stored in the moving member 21. When, thereafter, the forward end of the moving member 21 is directed toward the interior of the pipe arrangement and the stopper 29 is released, the elastic strain energy is released, whereby, as shown in FIG. 1, the elastic strain energy of the moving member 21 becomes a kinetic energy acting in the direction of the arrow 30, whereby the moving member 21 is guided by guide 20 and, while causing the holder 22 to rotate, the moving member 21 is continuously fed into the pipe arrangement.

According to the moving apparatus of this embodiment, the following effects are obtained. Namely, since the delivering or feeding of the moving member 21 is effected by utilizing the phenomenon that the elastic strain energy stored in the moving member 21 taken up is converted into a kinetic energy, the energy used can be small. Further, since the moving member 21 is slender and elongate and, in addition, has an elasticity and a moderate degree of flexibility, it is possible for the moving member 21 to pass through each of various practical complicated-curved pipe arrangements prepared by combining small-diameter pipes, bends, elbows, etc. Further, since the moving member 21 can be automatically wound and delivered whereby it can be moved with a moving velocity higher than that of the prior art, the working efficiency is increased. Further, since no drive means is connected to the moving member 21, the maintenance thereof is easy even when it is in operation and, at the same time, the supplying of a drive source is easy. Furthermore, since the moving member 21 is compact and simple in structure, it is possible to effectively secure providing the moving member 21 in the pipe arrangement with a space for loading and pulling the inspection devices and instruments, etc.

The wiring operation and inspecting operation with respect to the hollow curved pipe arrangement, both operations being performed with the use of the above-mentioned moving apparatus, will now be described in connection with FIGS. 2 and 3.

Figure 2:
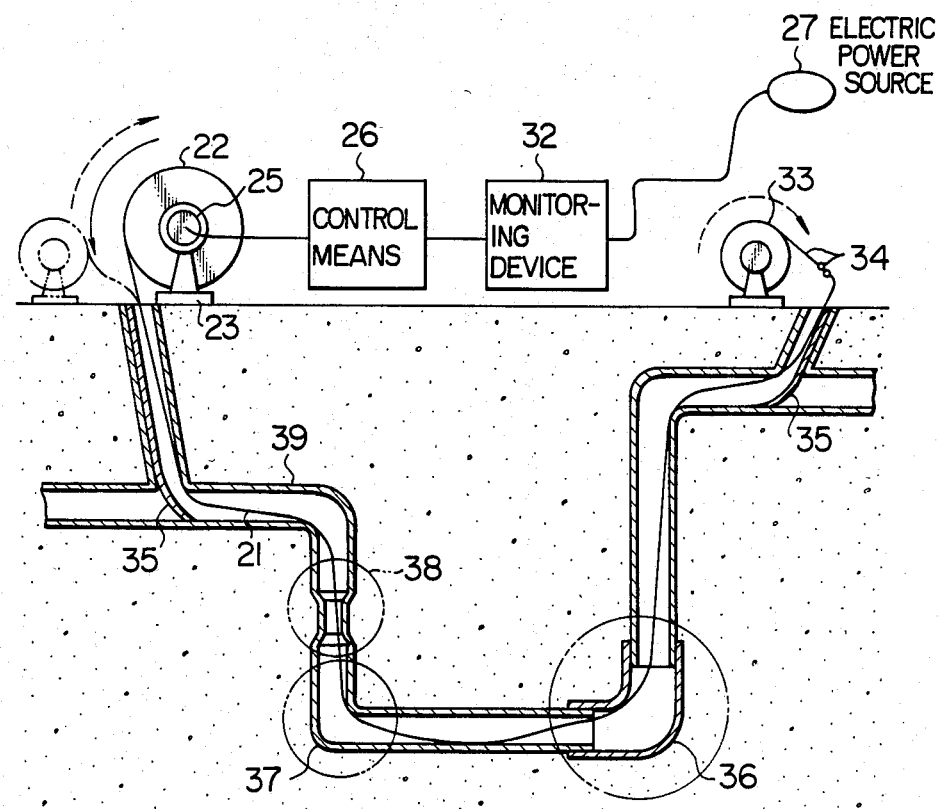
FIG. 2 is a sectional view of an example of the operation of drawing a cable into a pipe arrangement laid underground by using said moving apparatus.

In FIG. 2, an example of the method of performing the operation of wiring or drawing a tractive inserting wire used to insert various inspection devices and instruments into, or a cable such as, for example, an electric cable into, a pipe arrangement, is shown. The wiring operation in this case is carried out with the use of a system including the moving apparatus of FIG. 1 including the moving member 21, the prime mover 25 equipped with the detector, the holder 22, the supporting frame 23, the control means 26, etc. and, additionally, a working wire or cable 34, a winding and feeding drum 33, and a monitoring device 32 for monitoring the position, velocity, etc. of the moving member 21 and giving commands to the same, as follows. That is to say, the working wire or cable 34 is attached directly to a forward end of the moving member 21 and is thereby moved within the pipe arrangement, or alternatively after the moving member 21 has been once passed through the pipe arrangement, the working wire or cable 34 is attached onto the moving member 21 at the outlet of the pipe arrangement and, thereafter, the moving member 21 is moved back through the interior of the pipe arrangement. Accordingly, even when the pipe arrangement is of a complicated curved type based on a combination of an elbow 36, bend 37, specials 38, branch pipes, etc., it is possible automatically and continuously to perform the wiring operation while detecting and controlling the position, moving velocity, etc. of the wire, by applying a guide at the entrance and exit of the pipe arrangement by the use of, for example, a guide member 35 before moving the moving member 21.

With this embodiment, therefore, it is possible not only to perform the wiring operation with respect to various practical complicatedly-curved pipe arrangements which failed to be carried out with the use of the prior art technique, but also to increase the efficiency of wiring operation to high degree because of the availability of the high speed and highly efficient system. Besides, it is also possible to greatly reduce the operation cost.

Figure 3:
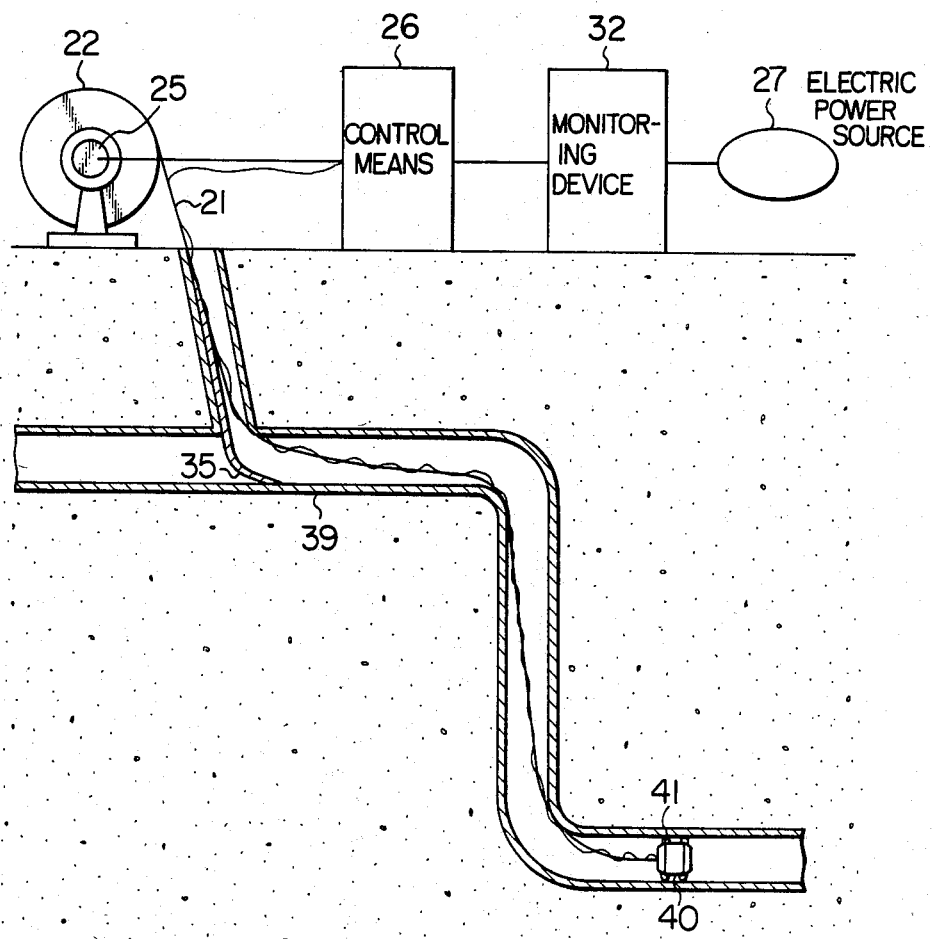
FIG. 3 is a sectional view showing an example of the operation of inspecting the interior of a pipe arrangement laid underground, by using said moving apparatus.

In FIG. 3, an example of the method of performing the operation of inspecting the interior of the pipe arrangement is shown. The inspecting operation in this case is carried out with the use of a system including the moving apparatus of FIG. 1 comprised of the moving member 21, the holder 22, the prime mover 25 equipped with the detector, the control means 26, etc. and, in addition, an inspection means 40 loaded on a forward end of the moving member 21 which includes sensors such as various cameras or repair instruments such as welding and fabricating instruments, an auxiliary appliance 41 similarly loaded on said forward end of the moving member 21 which includes a sled permitting said inspection means 40 to be stably passed through the pipe arrangement, a control means 26 having an additional function of operating and controlling the inspection means 40, and a monitoring device 32 adapted to enable the starting of the inspecting operation, confirming of the data involved, and collecting of such data, as follows. Namely, the inspection means 40 is moved up to a predetermined position in the pipe arrangement by the use of the moving apparatus, whereby it is possible to peform the checking, repairing and other desired operations with respect to the interior of the pipe arrangement.

With this embodiment, therefore, it becomes possible not only to perform the inspecting operation with respect to various practical complicated-curved pipe arrangements cannot be performed with the use of the prior art technique, but also to greatly increase the efficiency of inspecting operation because of the usability of the high speed and highly efficient system. Besides, it is also possible to greatly reduce the operation cost.

Figure 4:
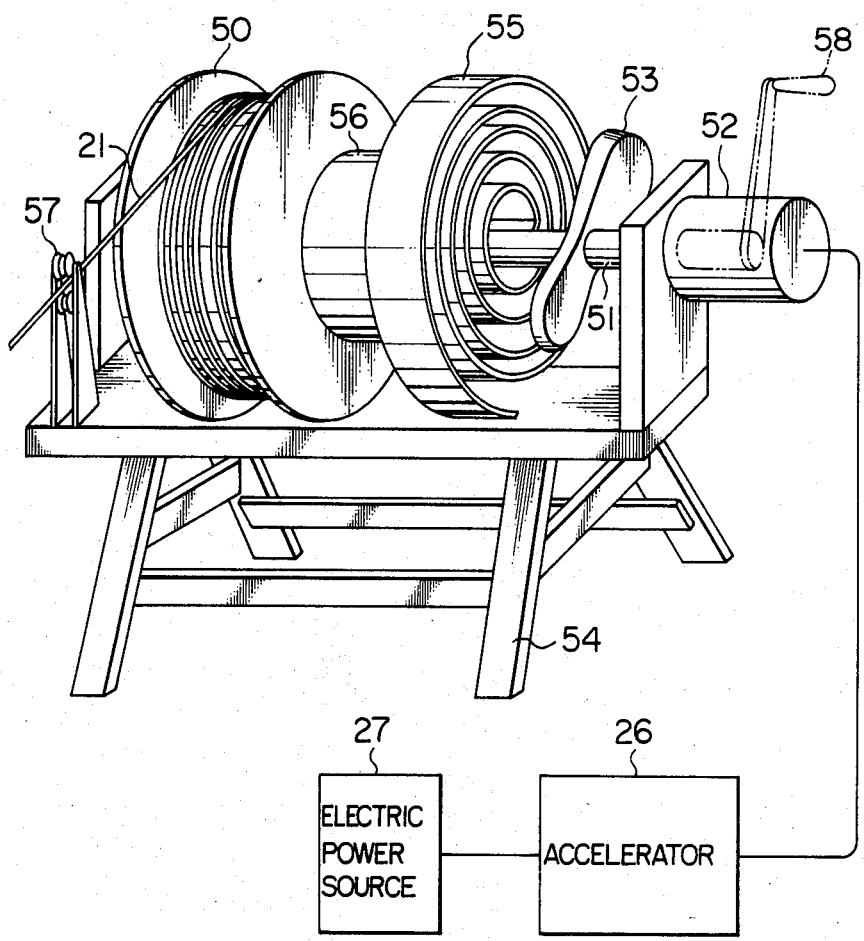
FIG. 4 is a perspective view of a moving apparatus according to another embodiment of the present invention; and, FIG. 5 is a plan view of an applied example of the moving member used or employed in the moving apparatus according to the present invention.

As shown in FIG. 4, the moving apparatus according to this second embodiment of the present invention comprises a moving member 21 having an elasticity and a moderate degree of flexibility, a winding or coiling drum 50 for winding and delivering this moving member 21, a prime mover 52 for driving the winding drum 50 to rotate through a rotating shaft 51, a flywheel 53 for stabilizing the operations of winding and delivering or feeding the moving member 21, and a supporting frame 54 for supporting these mentioned elements or members. It further comprises a spiral spring 55 for reserving the energy used to wind the moving member 21, an accelerator 26 for increasing the rate of winding the moving member 21 and the number of rotation of the prime mover at the time of delivering and feeding the moving member 21, and a pinch roller 57 provided at the vicinity of the winding drum 50, with the pinch roller 57 being used to adjust the movement of the moving member 21.

With the above-mentioned construction as well, it is also possible to obtain the same effect as that attainable with the construction of the moving apparatus shown in FIG. 1 and, to intensify the energy to feed the moving member 21 and further to obtain a higher moving velocity of the moving member 21. It should be noted here that a manually operable handle 58 can be used in place of the prime mover 52. In this case, a reduction in the cost can be achieved. Needless to say, with the use of the moving apparatus, according to this second embodiment, it is possible to perform the inspecting operation with respect to the interior of the curved pipe arrangement by using the inspection devices and instruments shown in FIG. 3, and the wiring operation with respect to the curved pipe arrangement shown in FIG. 2.

Figure 5:
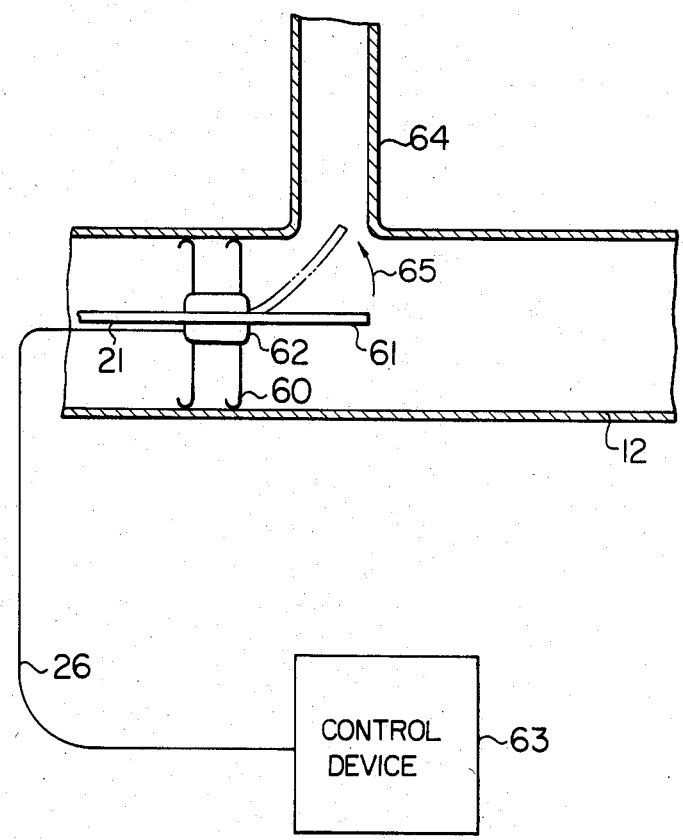

As shown in FIG. 5, a tip of a moving member of the moving member 21 of the above-mentioned moving apparatus has a supporting leg 60. The moving apparatus also includes a head 61 of a shape retention alloy, a heating and cooling device 62 for altering the direction of the head 61 by heating and cooling this shape retention alloy, and a control device 63 for controlling the heating and cooling operations of the heating and cooling device 62. In the construction of FIG. 5, when it is necessary to, change the advancing direction of for example, the moving member 21 toward a branch pipe 64 while being moved within a pipe arrangement 12, it is possible to heat the head 61 by the heating and cooling device 62 and thereby turn the head 61 to the branch pipe 64 through a predetermined angle and once insert it into the branch pipe 64 and, thereafter, cool it by the heating and cooling device 62 to restore it to its original conditions, thereafter moving the moving member 21 in a direction 65 going to the branch pipe 64. Or alternatively, it is possible to mount an inspection device (not shown) to a forward end of the moving member 21 and direct the head 61 simply in a direction perpendicular to the axis of the pipe arrangement, thereby performing, for example, the inspecting operation or the like with respect to the inner wall of the pipe arrangement. A good deal of additional effects are obtained by adding such moving member to the above-mentioned moving apparatus.

As have been above described, according to the present invention, there are provided a moving apparatus for moving a moving member within a hollow curved pipe arrangement, which comprises a long moving member made of a material having an elasticity and a moderate degree of flexibility, a supporting device for continuously winding the moving member therearound and supporting the same, and a prime mover connected to the supporting device through a rotating shaft thereof so as to supply an electric power to the supporting device at the time of winding the moving member, whereby an elastic strain energy is stored in the moving member by rotating the supporting device by the prime mover and winding the moving member around the same, and, while the elastic strain energy thus stored is continuously released, the moving member is allowed continuously to move within the pipe arrangement, and a method of performing operations within the pipe arrangement by using the moving apparatus. The operations including the operation of drawing a wire into the pipe arrangement by moving together with the moving member the wire to be drawn into the pipe arrangement at the time when the moving member is moved, or by moving beforehand the moving member of the moving apparatus up to an outlet of the pipe arrangement and connecting the wire to be drawn to a portion of the moving member and, thereafter, bringing the moving member back through the pipe arrangement, and the operation of inspecting the interior of the pipe arrangement by providing an inspection device on a tip end of the moving member of the moving apparatus and performing continuous inspecting operations within the pipe arrangement by means of such inspection device while the moving member is being moved within the pipe arrangement. Therefore, even when the pipe arrangement in question is a type consisting of small-diameter pipes, elbows, bends, specials, branch pipes or the like, or a type consisting of a complicatedly curved pipe arrangement, the moving apparatus of the present invention makes it possible freely to move the moving member within such a pipe arrangement, to cause the moving member to pass through various practical pipe arrangements little capable of being passed through by the prior art moving device, to permit the inspection device and the like to be loaded on and pulled by the moving member to readily inspect and repair the interior of the pipe arrangement, and easily to draw a wire, a cable, etc. into the pipe arrangement with the use of the moving member. As seen, particularly when employed in the operations within said pipe arrangement, the moving apparatus of the present invention is very effective

What is claimed is:

1. A moving apparatus for a hollow curved pipe arrangement, the apparatus comprising a long moving member made of a material having elasiticity and a moderate degree of flexibility, a supporting device for continuously winding said moving member therearound and supporting the same, and a prime mover means having a rotatable shaft connected to said supporting device for supplying power to said supporting device at a time of winding of said moving member and a time when an advancing velocity of said moving member becomes slower than a predetermined velocity during advancing of said moving member, whereby an elastic strain energy is stored in said moving member by rotating said supporting device by said prime mover means and winding said moving member around the same, and, when said stored elastic strain energy is continuously released, said moving member is advanced within the pipe arrangement, and, when said advancing velocity of said moving member becomes slower than the predetermined velocity during the advancing of said moving member, power of said prime mover means is added to increase the advancing velocity of said moving member.

2. A method of performing operations within a hollow curved pipe arrangement by using a moving apparatus for the pipe arrangement, comprising the steps of winding a long moving member made of a material having an elasticity and a moderate degree of flexibility around a supporting means allowed to rotate through the operation of a prime mover, storing an elastic strain energy in said moving member through the winding operation of said supporting means, advancing said moving member within said pipe arrangement by continuously releasing said elastic strain energy stored in said moving member and adding power of said prime mover when advancing velocity of said moving member becomes slower than a predetermined velocity during advancing of said moving member, and moving a wire to be drawn through said pipe arrangement jointly with said moving member at the time of advancing said moving member, thereby performing a wire operation.

3. A method of performing operations within a hollow curved pipe arrangement, comprising the steps of; winding a long moving member made of a material having an elasticity and a moderate degree of flexibility around a supporting means allowed to rotate through the operation of a prime mover, storing an elastic strain energy in said moving member through the winding operation of said supporting means, advancing said moving member within said pipe arrangement by continuously releasing said elastic strain energy stored in said moving member and adding power of said prime mover when advancing velocity of said moving member becomes slower than a predetermined velocity during advancing of said moving member to thereby advance said moving member once up to an outlet of said pipe arrangement, connecting a wire to be drawn to a portion of said moving member coming out of said outlet of said pipe arrangement, and thereafter, moving said moving member back through said pipe arrangement to thereby draw said wire through said pipe arrangement.

4. A method of performing operations within a hollow curved pipe arrangement by using a moving apparatus for the pipe arrangement, comprising the steps of; winding a long moving member made of a material having an elasticity and a moderate degree of flexibility around a supporting means allowed to rotate through the operation of a prime mover, storing an elastic strain energy in said moving member through the winding operation of said supporting means, advancing said moving member within said pipe arrangement by continuously releasing said elastic strain energy stored in said moving member and adding power of said prime mover when advancing velocity of said moving member becomes slower than a predetermined velocity during advancing of said moving member, and continuously performing an inspecting operation with respect to the interior of said pipe arrangement by means of an inspection means provided on a forward end of said moving member while said moving member is being moved within said pipe arrangement.

* * * * *